US010735902B1

(12) United States Patent
Houri et al.

(10) Patent No.: US 10,735,902 B1
(45) Date of Patent: Aug. 4, 2020

(54) METHOD AND COMPUTER PROGRAM FOR TAKING ACTION BASED ON DETERMINED MOVEMENT PATH OF MOBILE DEVICES

(71) Applicant: Accuware, Inc., Miami Beach, FL (US)

(72) Inventors: Cyril Houri, Miami Beach, FL (US); Denis Girard, Champigny-sur-Marne (FR)

(73) Assignee: Accuware, Inc., Miami Beach, FL (US)

( * ) Notice: Subject to any disclaimer, the term of this patent is extended or adjusted under 35 U.S.C. 154(b) by 110 days.

(21) Appl. No.: 16/222,891

(22) Filed: Dec. 17, 2018

Related U.S. Application Data

(63) Continuation-in-part of application No. 15/236,223, filed on Aug. 12, 2016, now Pat. No. 10,157,189, which is a continuation-in-part of application No. 14/673,186, filed on Mar. 30, 2015, now Pat. No. 9,418,284, said application No. 15/236,223 is a continuation-in-part of application No. 15/139,631, filed on Apr. 27, 2016, now Pat. No. 9,911,190.

(60) Provisional application No. 61/977,580, filed on Apr. 9, 2014.

(51) Int. Cl.
| | |
|---|---|
| G06K 9/00 | (2006.01) |
| H04W 4/024 | (2018.01) |
| G06T 7/246 | (2017.01) |
| H04W 64/00 | (2009.01) |
| G06T 7/73 | (2017.01) |

(52) U.S. Cl.
CPC ............ *H04W 4/024* (2018.02); *G06T 7/248* (2017.01); *G06T 7/74* (2017.01); *H04W 64/003* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,134,448 A | 10/2000 | Shoji et al. | |
| 6,438,491 B1 | 8/2002 | Farmer | |
| 6,799,049 B1 | 9/2004 | Zellner et al. | |
| 7,042,391 B2 | 5/2006 | Meunier et al. | |
| 7,155,238 B2 | 12/2006 | Katz | |
| 7,319,878 B2 | 1/2008 | Shyenblat et al. | |
| 7,433,695 B2 | 10/2008 | Gordon et al. | |
| 7,437,444 B2 | 10/2008 | Houri | |

(Continued)

*Primary Examiner* — Shervin K Nakhjavan
(74) *Attorney, Agent, or Firm* — Brian Roffe

(57) ABSTRACT

Method for controlling movement of a mobile device includes obtaining an analyzeable video from an imager on the device during its movement by obtaining at least one video from the imager, and analyzing, using a processor, each video to determine presence of a fixed-in-position object in multiple sequentially obtained frames until a video is obtained including at least one fixed-in-position object in multiple sequentially obtained frames which constitutes the analyzeable video. This video is analyzed on a frame by frame basis to determine distance and direction moved by the device, which is analyzed relative to predetermined distance and direction intended for movement of the device to determine any differences, which result in changes in movement of the device. Relocation of the device is achieved by recognizing a previously imaged, fixed object in subsequent frames and comparing the position of the device at both times, with a deviation resulting in relocation.

20 Claims, 7 Drawing Sheets

(56) References Cited

U.S. PATENT DOCUMENTS

| | | |
|---|---|---|
| 7,466,986 B2 | 12/2008 | Halcrow et al. |
| 7,475,897 B2 | 1/2009 | Morgan et al. |
| 7,493,127 B2 | 2/2009 | Morgan et al. |
| 7,684,894 B2 * | 3/2010 | Sakai .................. G05D 1/0246 700/245 |
| 7,696,923 B2 | 4/2010 | Houri |
| 8,195,216 B2 | 6/2012 | Houri |
| 8,239,510 B2 | 8/2012 | Houri |
| 8,565,788 B2 | 10/2013 | Houri |
| 8,670,381 B1 | 3/2014 | Houri |
| 8,807,428 B2 | 8/2014 | Morgan |
| 8,811,746 B2 * | 8/2014 | Sawada .................. G01C 3/08 382/191 |
| 8,958,601 B2 | 2/2015 | Lin |
| 8,983,773 B2 | 3/2015 | Hamilton, II et al. |
| 9,036,867 B2 | 5/2015 | Chiussi |
| 9,311,523 B1 | 4/2016 | Nam |
| 9,324,003 B2 | 4/2016 | France et al. |
| 10,007,269 B1 * | 6/2018 | Gray .................. G06K 9/6263 |
| 10,429,839 B2 * | 10/2019 | Liu .................. B64C 39/024 |
| 10,618,673 B2 * | 4/2020 | Chan .................. G06K 9/6201 |
| 2002/0044691 A1 | 4/2002 | Matsugu .................. G06K 9/20 382/218 |
| 2004/0167688 A1 | 8/2004 | Karlsson et al. |
| 2005/0033512 A1 * | 2/2005 | Skarine .................. G06F 3/0317 701/400 |
| 2008/0004750 A1 * | 1/2008 | Ban .................. B25J 9/1692 700/245 |
| 2008/0247621 A1 * | 10/2008 | Zarkh .................. A61B 6/481 382/130 |
| 2009/0285450 A1 | 11/2009 | Kaiser et al. |
| 2010/0020074 A1 | 1/2010 | Taborowski |
| 2010/0208057 A1 | 8/2010 | Meier et al. |
| 2010/0222925 A1 * | 9/2010 | Anezaki .................. G05D 1/0253 700/253 |
| 2011/0074974 A1 * | 3/2011 | Hildreth .................. H04N 1/00352 348/222.1 |
| 2011/0211760 A1 | 9/2011 | Boncyk et al. |
| 2011/0282578 A1 | 11/2011 | Miksa et al. |
| 2012/0315884 A1 | 12/2012 | Forutanpour et al. |
| 2013/0136300 A1 | 5/2013 | Wagner |
| 2013/0223673 A1 | 8/2013 | Davis |
| 2013/0271607 A1 * | 10/2013 | Takahashi .................. G01C 21/30 348/148 |
| 2013/0314442 A1 | 11/2013 | Langlotz et al. |
| 2014/0016821 A1 | 1/2014 | Arth et al. |
| 2014/0022394 A1 | 1/2014 | Bae |
| 2014/0223319 A1 | 8/2014 | Uchida |
| 2014/0226864 A1 * | 8/2014 | Venkatraman .................. G01C 21/12 382/107 |
| 2014/0297485 A1 | 10/2014 | Steely et al. |
| 2015/0043733 A1 | 2/2015 | Swaminathan |
| 2015/0178565 A1 | 6/2015 | Rivlin et al. |
| 2015/0215383 A1 | 7/2015 | Sun et al. |
| 2015/0243030 A1 | 8/2015 | Pfeiffer |
| 2015/0287246 A1 | 10/2015 | Huston et al. |
| 2015/0302260 A1 * | 10/2015 | Kijima .................. G08G 1/166 701/70 |
| 2015/0339951 A1 * | 11/2015 | Stevens .................. G09B 21/008 348/62 |
| 2016/0063345 A1 | 3/2016 | Nomura et al. |
| 2016/0086372 A1 | 3/2016 | Trull et al. |
| 2016/0253808 A1 * | 9/2016 | Metzler .................. G01C 15/00 382/103 |
| 2016/0275986 A1 * | 9/2016 | Nord .................. G06F 3/04883 |
| 2017/0123425 A1 * | 5/2017 | Zhao .................. G06K 9/0063 |
| 2017/0251169 A1 * | 8/2017 | Meier .................. B64C 39/024 |
| 2017/0344114 A1 | 11/2017 | Osterhout et al. |
| 2018/0053303 A1 * | 2/2018 | Leuschner .................. G01C 11/04 |
| 2018/0189565 A1 * | 7/2018 | Lukierski .................. G06T 7/55 |
| 2018/0261014 A1 * | 9/2018 | Seo .................. G08G 1/096775 |
| 2019/0094149 A1 * | 3/2019 | Troy .................. G01M 5/0075 |
| 2019/0265734 A1 * | 8/2019 | Liu .................. B64C 39/024 |
| 2020/0117210 A1 * | 4/2020 | Ren .................. G06T 7/73 |
| 2020/0159223 A1 * | 5/2020 | Egner .................. G05D 1/12 |
| 2020/0167953 A1 * | 5/2020 | Liu .................. H04N 5/23299 |

* cited by examiner

METHOD AND COMPUTER PROGRAM FOR TAKING ACTION BASED ON DETERMINED MOVEMENT PATH OF MOBILE DEVICES

CROSS-REFERENCE TO RELATED APPLICATIONS

This application is a continuation-in-part (CIP) of:
U.S. patent application Ser. No. 15/236,223 filed Aug. 12, 2016, now U.S. Pat. No. 10,157,189, which is a CIP of:
U.S. patent application Ser. No. 14/673,186 filed Mar. 30, 2015, now U.S. Pat. No. 9,418,284, which claims priority under 35 U.S.C. § 119 of U.S. provisional patent application Ser. No. 61/977,580 filed Apr. 9, 2014; and
U.S. patent application Ser. No. 15/139,631 filed Apr. 27, 2016, now U.S. Pat. No. 9,911,190, all of which are incorporated by reference herein.

FIELD OF THE INVENTION

The present invention relates generally to a method, system and computer program to determine a path of movement of a mobile device and optionally take one or more actions in response to the determined path of movement, e.g., control further movement of the mobile device based on the determined path of movement.

The present invention further relates to a method, system and computer program that provides information about movement of a mobile device or a person holding a mobile device based on image analysis.

BACKGROUND OF THE INVENTION

Cellular telephones, smartphones and other portable telecommunications devices often include at least one imaging device to take pictures of objects and other patterns of pixels. Images are taken upon command by the user.

The images can be used for a variety of different purposes. For example, U.S. Pat. No. 8,807,428 (Morgan), entitled navigation of mobile devices, describes a method for navigation of a mobile device including determining spatial information of at least one beacon detected in an image relative to the image, the image being an image of the beacon within at least part of an environment surrounding the mobile device, and determining a position of the mobile device based on the spatial information. This latter step entails encoded visual information of the beacon and at least two indicators of the beacon detectable only in a restricted wavelength image. The two indicators are located on either side of the encoded visual information.

U.S. Pat. No. 8,958,601 (Lin) entitled optical navigation method and device using same, describes an optical navigation method, which includes sequentially obtaining three images, choosing a main reference block in one image, comparing the main reference block and a another image by block matching comparison to determine a first motion vector, resizing the main reference block according to the first motion vector to generate an ancillary reference block having a size smaller than the main reference block, and comparing the ancillary reference block and yet another image by block matching comparison to determine a second motion vector.

U.S. Pat. No. 8,983,773 (Hamilton, II et al.) entitled pictorial navigation, describes methods, systems and program products for providing pictorial information relevant to a geographic location. In the method, a characteristic relevant to a geographic location is selected, a pictorial image database is searched for images having an embedded tag associated with the characteristic, and in response to this searching, at least one image file is retrieved from the database that has an embedded tag correlated to the geographic location characteristic. A physical appearance or an attribute of the location is visually depicted. Characteristics of the at least one image file are analyzed and preferred image data is selected from the at least one image file and formatted for presentation. The formatted image data is associated with the geographic location, and presented in association with the geographic location. Associated image data may indicate a distance and direction from a geographic location. Routing system applications are enabled to present pictorial information with navigation route points.

U.S. Pat. Appln. Publ. No. 20140022394 (Bae et al.) describes a method for tracking an object including obtaining an image captured by a camera, setting a plurality of patterns having various sizes, according to a distance from a horizon in the image to a plurality of pixels in the image, extracting an object matching one of the plurality of patterns having various sizes, while scanning the image using the plurality of patterns having various sizes, and displaying information about a position of the extracted object in the image.

SUMMARY OF THE INVENTION

A method for controlling movement of a mobile device based on the determined path of movement of the mobile device includes obtaining an analyzeable video from an imaging device on the mobile device during movement of the mobile device. This may entail obtaining at least one video from the imaging device on the mobile device during movement of the mobile device, and analyzing, using a processor, each obtained video to determine presence of a fixed-in-position object in multiple sequentially obtained frames of the video until a video is obtained including at least one fixed-in-position object in multiple sequentially obtained frames which constitutes the analyzeable video. Once the analyzeable video is obtained, it is analyzed on a frame by frame basis to determine distance and direction moved by the mobile device while obtaining the analyzeable video using the processor, and in real-time, i.e., during movement of the mobile device while obtaining the analyzeable video and in the interval between frames. This provides a series of vectors, each vector representing movement in the time interval between when the frames were obtained.

The determined path of movement of the mobile device may be used in various ways. In one embodiment, the determined distance and direction moved by the mobile device while obtaining the analyzeable video are analyzed relative to predetermined distance and direction intended for movement of the mobile device, respectively, to determine any differences. This analysis is performed using the processor and during the movement of the mobile device while obtaining the analyzeable video, i.e., in real-time. A change in movement of the mobile device is effected, i.e., caused to occur, whenever any differences are determined to be present between the distance and/or direction moved by the mobile device while obtaining the analyzeable video and the predetermined distance and/or direction intended for movement of the mobile device.

To optimize the processing, each video may be transmitted wirelessly to a server that includes or is associated with the processor, in which case, the analyzing steps are performed at the server. The server is separate and apart from the mobile device. Alternatively, the processor may be situated on or in the mobile device such that the analyzing steps are performed at the mobile device.

Another action that can be alternatively or additionally taken using the determined path of movement of the mobile device is to display the path on a display, e.g., on the mobile device or a mobile device monitoring system. In this case, a diagram of movement of the mobile device is generated by the processor, including any changes in movement that have been effected. This diagram is provided to the mobile device itself, and/or to the mobile device monitoring system. The diagram of movement of the mobile device may be displayed in two-dimensions on the display or in three-dimensions on the display, depending on, for example, the ability of the mobile device to move in two or three dimensions.

The method also includes a relocation feature that is based on recognition of the same object in the video frames taken at different time with the mobile device being moved in between. When incorporating the relocation feature, the method includes analyzing frames of the analyzeable video to determine whether a previously imaged, fixed object is present in any of the frames, and when that object is determined to be present, analyzing whether a position of the mobile device relative to that object is accurate based on data about that object and the mobile device stored in a memory component accessible to the processor. If not, adjustment of the position of the mobile device is necessary based on the determined position of the mobile device relative to that object. When a diagram of movement of the mobile device is generated and displayed, the displayed position of the mobile device is adjusted.

Another way to view the relocation feature is to initially determine the presence of an object in a frame of the analyzeable video, store identification data about the object whose presence is initially determined in a memory component, and determine the position of the mobile device relative to that object. Thereafter, subsequent frames of the analyzeable video are analyzed to determine whether that object is present in any of the subsequent frames, and when that object is present, a determination is made whether a current position of the mobile device is accurate relative to that object. If not, the position of the mobile device is adjusted based on the determined position of the mobile device relative to that object.

Another method for controlling movement of a mobile device based on a determined path of movement of the mobile device entails storing data about the fixed-in-position object at a beginning of the analyzeable video, and then after the frame by frame analysis, a diagram of movement of the mobile device is generated and displayed on a display. The relocation feature is applied using the stored data. Comparison of the determined path relative to the predetermined distance and direction intended for movement of the mobile device is not required, and is optional in this embodiment.

A computer program embodied on non-transitory computer storage medium in accordance with the invention is resident at a server and configured to receive at least one video from an imaging device on a mobile device during movement of the mobile device, and analyze each video to determine presence of a fixed-in-position object in multiple sequentially obtained frames of the video until a video is obtained including at least one fixed-in-position object in multiple sequentially obtained frames which constitutes an analyzeable video. The computer program also analyzes the analyzeable video on a frame by frame basis to determine distance and direction moved by the mobile device while obtaining the analyzeable video. In one embodiment, the computer program further analyzes the determined distance and direction moved by the mobile device while obtaining the analyzeable video relative to predetermined distance and direction intended for movement of the mobile device to determine any differences, and effects a change in movement of the mobile device whenever any differences are determined to be present. Additionally or alternatively, the computer program is configured to implement the relocation feature, i.e., analyze frames of the analyzeable video to determine whether a previously imaged, fixed object is present in any of the frames, and when that object is determined to be present, analyze whether a position of the mobile device relative to that object is accurate based on data about that object and the mobile device stored in a memory component accessible to the processor, and if not, adjust the position of the mobile device based on the determined position of the mobile device relative to that object. If the relocation feature is implemented, the computer program may also be configured to generate a diagram of movement of the mobile device including any changes in movement that have been effected, cause display of the diagram of movement of the mobile device on a display, and cause display the adjusted position of the mobile device on the display.

BRIEF DESCRIPTION OF THE DRAWINGS

The invention, together with further pattern of pixels and advantages thereof, may best be understood by reference to the following description taken in conjunction with the accompanying drawings, wherein like reference numerals identify like elements, and wherein.

DETAILED DESCRIPTION OF THE INVENTION

Figure 1:
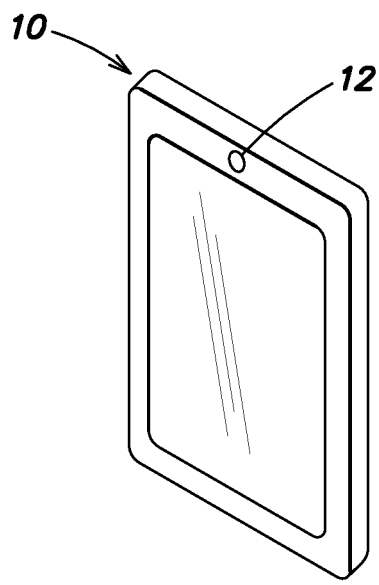
FIG. 1 is a front view of a first embodiment of a mobile device in which the invention may be applied.
Figure 2:
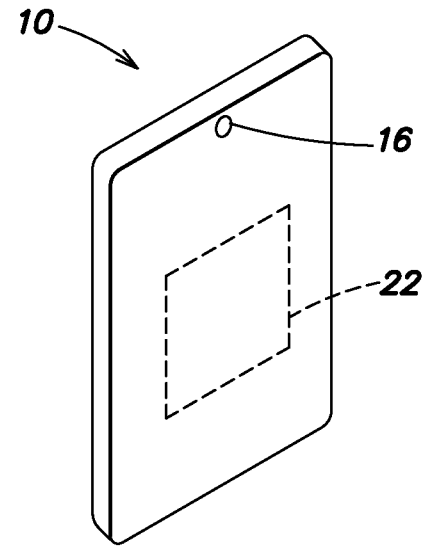
FIG. 2 is a rear view of the first embodiment of a mobile device in which the invention may be applied.
Figure 3:
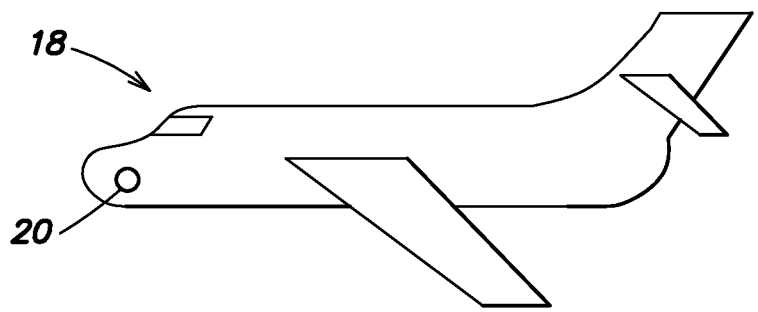
FIG. 3 is a perspective view of a second embodiment of a mobile device in which the invention may be applied.

Referring to the accompanying drawings wherein like reference numbers refer to the same or similar elements, the present invention is designed for use with a mobile device with at least one imaging device or system. As shown in FIG. 1, an example of a mobile device 10 is a portable communications device that includes an imaging device 12 on a front side, i.e., that side on which the screen 14 is location, as well as an imaging device 16 on a rear side (see FIG. 2). Another example of a mobile device in which the invention may be applied is a drone 18 as shown in FIG. 3 that includes an imaging device 20. A "drone" as used herein will generally mean a pilotless flying vehicle. An example of a common drone for use with the invention is a quad-copter type of drone that may fly inside a building but for which there is no precise way to get an accurate position inside the building. The invention is not limited to the illustrated mobile device 10, i.e., a communications device and a drone 18, and encompasses all mobile devices that include an imaging device such as a camera. Examples include laptop computers, tablets, notepads, and the like.

Figure 4:
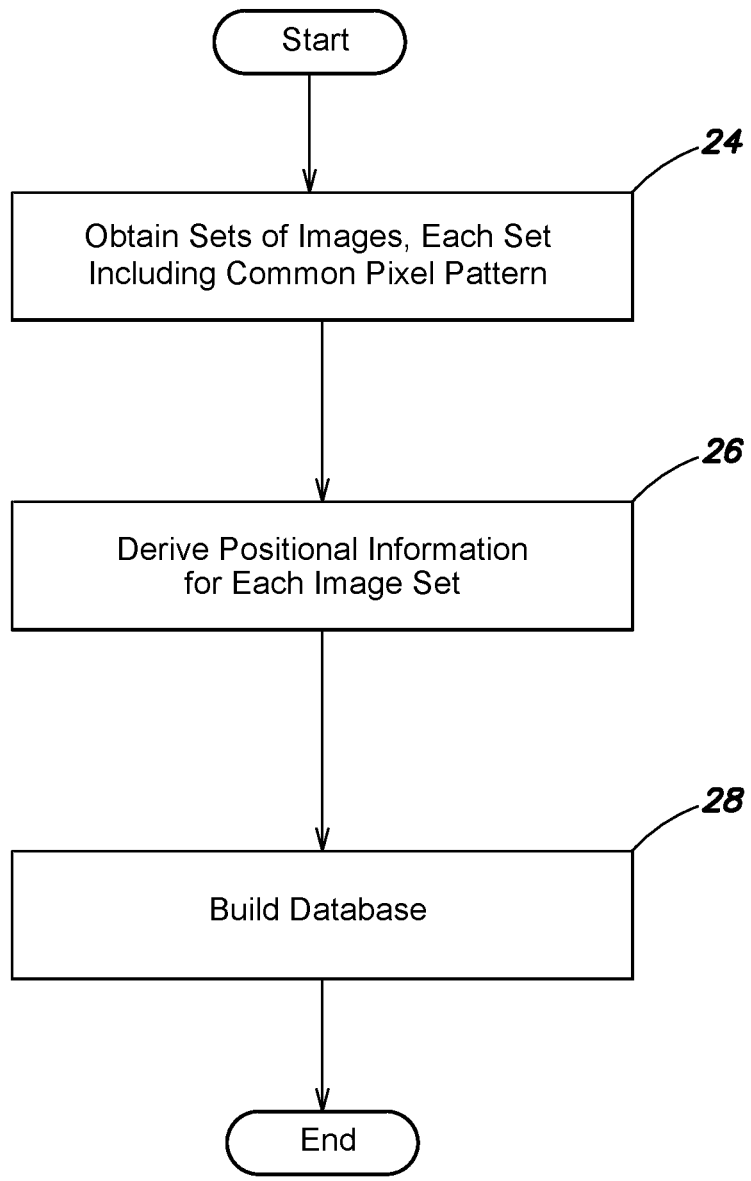
FIG. 4 is a flow chart of a method for generating a database of positional information for pixel patterns in accordance with the invention.

FIG. 4 is a flow chart of a method for generating a database of pixel patterns with positional information using a mobile device with at least one imaging device. More specifically, the database can be said to include positional relationships between a size and/or angular orientation of numerous pixel patterns and associated determined positions of the mobile device when images including the pixel patterns having that size and/or angular orientation were obtained, which positional relationships are used to provide an estimation of, during operative use of the database, the position of a mobile device that images one of the pixel patterns for which positional relationships are stored in the database.

This database generation is provided as an example of the manner in which a database 22 of pixel patterns and positional information or relationships is generated or obtained, for later use by the mobile device 10 in providing positional information based on pixel pattern analysis or providing positional data or information that is selectively presented based on input positional data. The combination of information about pixel pattern appearance (size and/or angular orientation) and position data of a mobile device when an image including the pixel pattern is obtained may be referred to as a positional relationship. Other ways to generate the database 22 are also envisioned as being within the scope and spirit of the invention. For the purposes of this application, database 22 may represent a single database or a plurality of physically separate databases.

Each positional relationship may include coordinates of the position of an imaging device when an image taken by the imaging device includes a pixel pattern having a quantifiable size and/or angular orientation. The positional relationships are referenced when an image is obtained by a mobile device with the same general appearance, or more particularly size, as the pixel pattern in an image used to generate the database. That is, if an image includes a pixel pattern that has the same appearance, e.g., size and/or angular orientation, as one of the pixel patterns used to generate the database 22, then this would mean that the imaging device taking the image is situated in the same position as an imaging device was earlier situated when the pixel pattern was processed to generate a positional relationship for inclusion in the database 22. This positional relationship may include longitude and latitude coordinates, or any other coordinate system that is two or three-dimensional and covers a surface area of interest. Thus, the positional relationship provides the position of an imaging system when obtaining an image including the pattern of pixels and information about the appearance of the pattern of pixels relative to that position. Using the appearance of a pixel pattern, e.g., its size and/or angular orientation, and referring to the positional relationships between pixel pattern appearance and mobile device position, position of a mobile device is determinable, or at least an estimate thereof can be calculated by a processor receiving data about the positional relationship.

Accordingly, the positional relationship between a size of the pattern of pixels and an associated determined position of the mobile device when the at least one image including the pattern of pixels was obtained enables determination of an estimation of the position of the mobile device upon input of another image including the same pattern of pixels. As mentioned above, if the new image has the same pattern of pixels with the same size and angular orientation, then the positional relationships from the database are used to output information that the mobile device is in the position associated with that pattern of pixels with that size and angular orientation. This differs from geotagging since there is typically no consideration or measure of the size and/or angular orientation of an object when geotagging.

Typically, for processing purposes, the pixel pattern will be assigned a digital signature, with the digital signature of multiple images being compared to determine which contain a common digital signature indicative of the same pixel pattern. Pixel patterns with common digital signatures are grouped together since they will be considered to represent the same object providing the pattern of pixels.

As a first step 24, a set of images is obtained using the imaging device of the mobile device. This set may include only one image. Alternatively, the set may include a plurality of images taken from different positions of the mobile device relative to a common, stationary pattern of pixels. In the latter case, the set includes the common, stationary pattern of pixels in each image.

Obtaining the images when the set includes multiple images may involve positioning the mobile device 10 in each of the positions relative to the pattern of pixels at different times and pressing an image obtaining actuator on the mobile device 10 while the mobile device 10 is in each of the different positions. This actuator may be, as is common, a designated area of the screen 14 of the mobile device 10.

As an alternative, a panoramic camera may be attached to the mobile device 10 and actuated to obtain the single image or plurality of images.

These images are processed in a second step 26 to derive positional information about the pixel pattern. This positional information is based on analysis of the position of the mobile device when each image was taken and the appearance of the pixel pattern in each image. Particularly, the pixel pattern is analyzed with respect to its size and/or the angle between the imaging direction and the pixel pattern to derive the positional information.

As an example, when a single image is taken in step 24, the position of the pixel pattern or object in the image is known and the position of the mobile device 10 is known. As such, the angle AT between the imaging direction of the imaging device of the mobile device 10 and the object is known (see FIG. 7). This imaging angle is associated with the pixel pattern, along with the size of the pixel pattern relative to the position of the mobile device 10.

Figure 5:
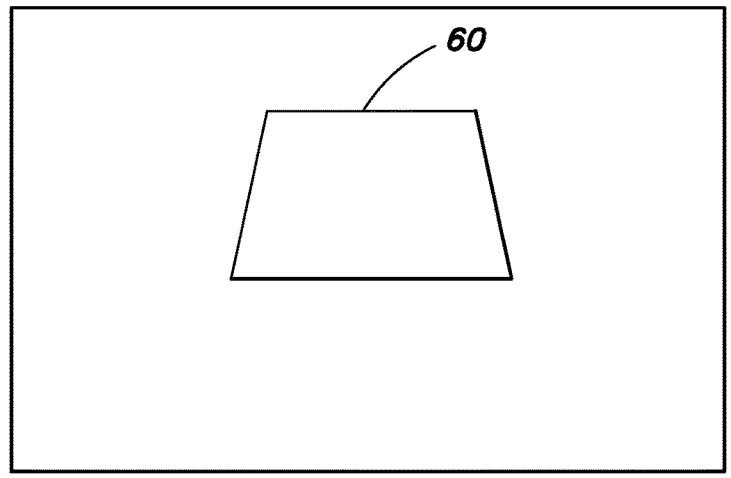
FIG. 5 is a schematic showing the manner in which multiple images including a common, stationary pixel pattern, in this case, a picture on a wall, are obtained.
Figure 5:
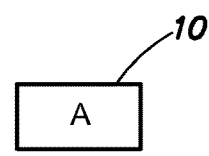
Figure 5:
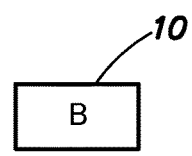
Figure 5:
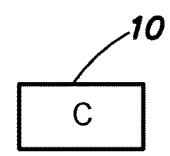
Figure 5:
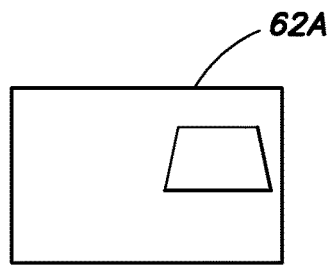
Figure 5:
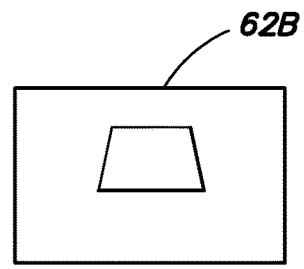
Figure 5:
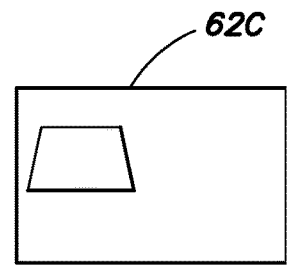

Referring to FIG. 5, three different positions of the mobile device 10 are shown, A, B and C, although images in any number of different positions including the common pixel pattern, in this case, a picture 60 on a wall, may be obtained. The image 62A obtained of the picture 60 when the mobile device 10 is in position A shows the picture 60 to the right of the image. The image 62B obtained of the picture 60 when the mobile device 10 is in position B shows the picture 60 in the center of the image. The image 62C obtained of the picture 60 when the mobile device 10 is in position C shows the picture 60 to the left of the image. The angular orientation of the picture 60 is therefore different in the three images 62A, 62B and 62C. In a similar manner, by moving the mobile device 10 closer and farther away from the picture, different images may be obtained with different sizes of the picture 60.

A plurality of sets of images is obtained in the same manner, with each set including a common, stationary pixel pattern, usually but not required to be an object. For example, the pixel pattern may be a pattern of buildings or a number on a building. It is also possible for one or more of the sets to have only a single image and positional information derived therefrom.

The positional information about the pixel patterns is stored in the database 22 in association with the pixel patterns, in step 28. The database 22 may therefore include a form of a table with pixel patterns in a searchable form and positional information to be output.

Once generated, the database 22 may be shared with other mobile devices in a manner known to those skilled in the art. Similarly, a database generated using another mobile device may be provided to mobile device 10 to increase the number of pixel patterns and associated positional information stored in the database 22.

Figure 6:
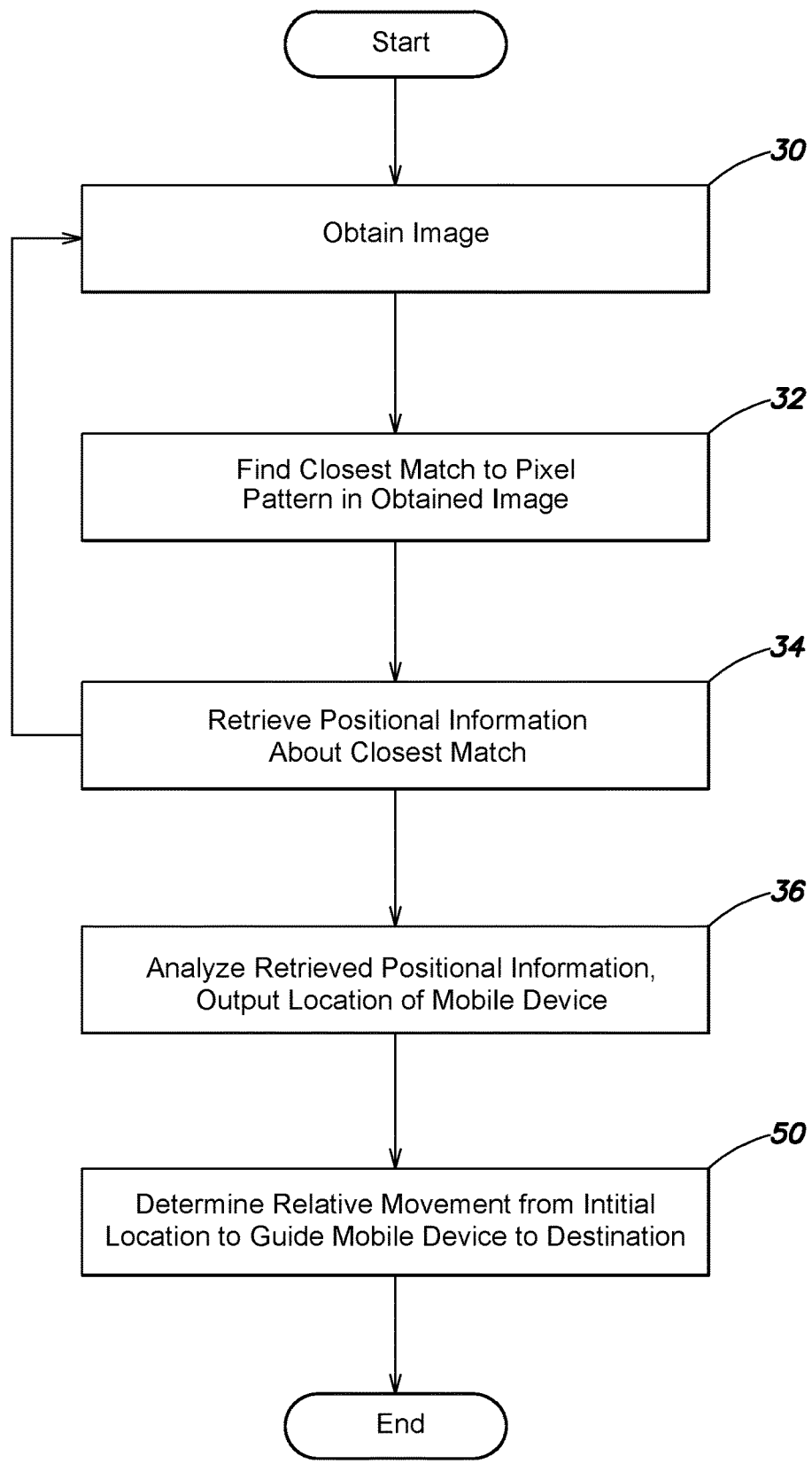
FIG. 6 is a flow chart of a method for using a database of positional information for pixel patterns or objects in accordance with the invention in order to provide a location of a mobile device based on imaging, and a navigation method based on the location provided.

As for use of the database 22, a flow chart of a method for determining location of the mobile device 10 is shown in FIG. 6 and includes obtaining at least one image including a stationary pattern of pixels using the mobile device 10 in step 30. In step 32, a processor of the mobile device 10 searches through the database 22 of pixel patterns for the obtained pattern of pixels, and in step 34, retrieving positional information about one of the pattern of pixels that is deemed to be a closest match to the obtained pattern of pixels. Algorithms to perform this closest match processing are known to those skilled in the art to which this invention pertains.

In step 36, an analysis is performed to obtain, as a result, the location information about the mobile device 10. This analysis is typically analysis of an angle between an imaging direction in which the image was obtained by the mobile device 10 and the imaging direction in which the pattern of pixels in the image containing the closest match pixel pattern, and/or analysis of a size of the pattern of pixels in the image relative to the size of the pixel pattern in the image containing the closest match pixel pattern, both considered in combination with the retrieved positional information.

Figure 7:
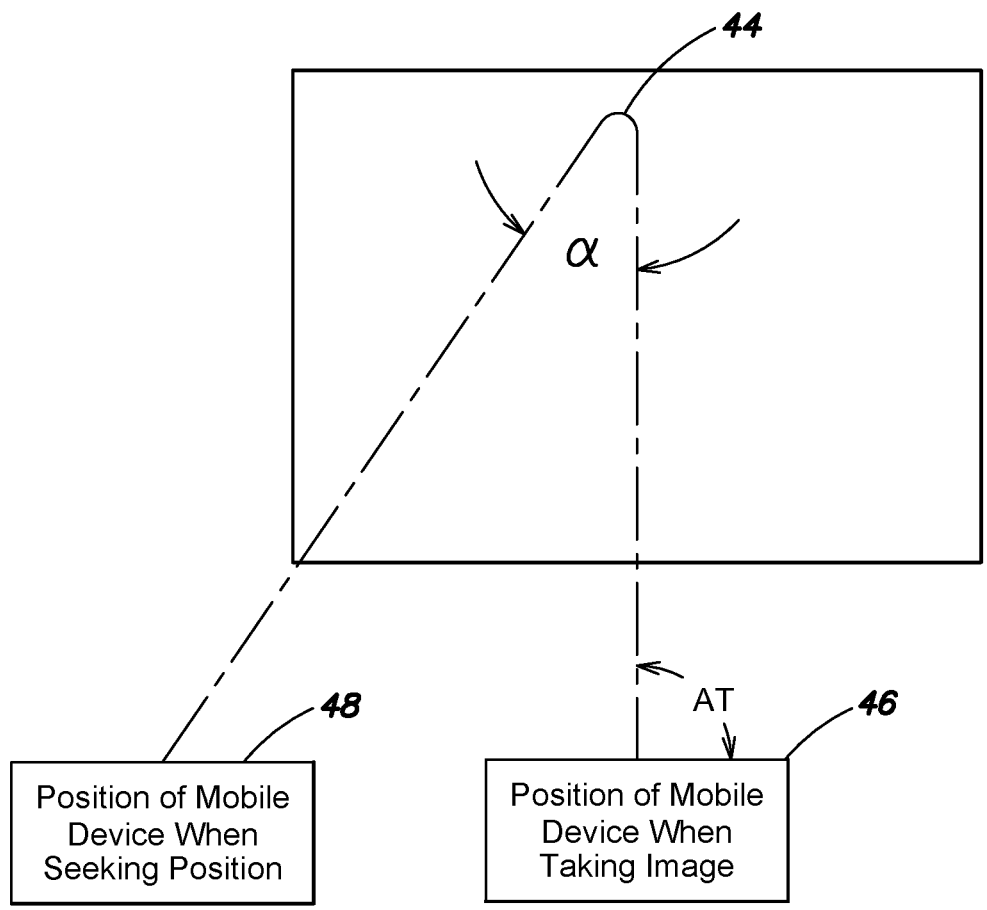
FIG. 7 is a schematic showing use of an angle to determine mobile device location.

As to the angular analysis, it may be known that the image used in the database generation phase was taken from directly in front of the pixel pattern (see position 46 in FIG. 7). During the operational phase, an image is obtained from a position to the left of position 46, i.e., from position 48. As such, image analysis will indicate the angle α between the imaging direction, i.e., the direction in which the imaging device is pointing when taking the picture to obtain location information, and the imaging direction in which the image was taken for preparation for storage in the database. This angle can be, mathematically, applied in combination with the position of the mobile device 10 when the image was taken for preparation for storage in the database (position 46) in order to derive the current location of the mobile device 10 (position 48). That is, position 48 is a function of position 46 and angle α.

As to the size analysis, a similar analysis may be performed. If the size of the pixel pattern in the image taken for preparation for storage in the database when the mobile device 10 was in position 46 is known, and the size of the same pixel pattern in the image taken by the mobile device 10 in its current position 48 is determined by image analysis, then the location of the mobile device 10 when seeking its current position 48 is a function of position 46 and the size differential.

As an example of a use wherein the size alone is used to provide the position of the mobile device 10, if the image currently obtained by the mobile device 10 is determined to include an object, such as a monument, and the size of the monument in the currently obtained image is determined to be half that of the size of the monument in the image from the database, then the processor of the mobile device 10 will output that the mobile device 10 is at a distance about twice that of the distance between the monument and the location of the mobile device 10 when the image was taken. A radius of this distance will be output if only one image is used. By using additional images and/or an angular analysis from one or more images, the output location of the mobile device 10 can be improved. Algorithms to perform this enhanced location output would be readily ascertainable by those skilled in the art to which this invention pertains in view of the disclosure herein.

The positional information to be provided may be that the mobile device 10 is at a specific distance from the pixel pattern representing an object or some other stationary object, or more general, e.g., a village, city, town, street or building where the object is located. The provided information may simply be that the mobile device 10 is situated in front of the object. A map may be displayed on a screen 14 including the location of the mobile device 10 to enable the viewer to view the screen 14 and know their position relative to indicia on the displayed map. The display on the screen 14 may also include the position of the pixel pattern being used to determine the position of the mobile device 10. Additionally, a pointer may be used to indicate the angle between the imaging direction of the imaging device of the mobile device 10 and the pixel pattern. Identification of the pixel pattern may also be provided, if known, and associated with the pixel pattern in the database 22. Any other use of the position of the mobile device 10 determined in the above manner is also contemplated as being within the scope of the invention.

The angular analysis may be performed independent of the size analysis or both in combination. Other characteristics of the images may also be used.

Although it is possible to provide the location of the mobile device 10 using only a single image containing a pixel pattern that is found in the database, preferably multiple images are obtained and used to provide positional information to improve the accuracy of the location determination of the mobile device 10. To this end, the method may involve a loop to obtain and analyze additional images, see the link from step 34 to step 30. Moreover, since it is not guaranteed that a currently obtained image will contain a pixel pattern that can be recognized as being in the database, taking multiple images increases the probability that an object in an image will be recognized.

Recognition of an object as being in the database may involve analysis of the images relative to the pixel patterns or digital signatures thereof and to a matching threshold. Only if the analysis determines that the pixel pattern of the currently obtained image is above the matching threshold, then the positional information about the pixel pattern will be output by the processor.

The methods explained with reference to FIGS. 4 and 6 can be executed by a computer program resident in memory media or a memory component in the mobile device 10 or elsewhere. The computer program would be designed to allow for obtaining images (direct the imager to take images), ensuring that the images contain a common pixel pattern to enable derivation of positional information for storage in the database, management of the database and then subsequent use of the database upon receipt of an image with a pixel pattern. The computer program may be resident in non-transitory computer-readable media The computer program is operable in two different modes. The first mode would be the database generation mode or training phase, explained with reference to FIG. 4. This database generation mode is independent of the second mode, i.e., the database use mode explained with reference to FIG. 6, and vice versa. The database use mode may use the database generated in accordance with the flow chart in FIG. 4 or with any other database however generated that includes pixel patterns or objects for example, and positional information about them. A database of geo-tagged objects may be used. Indeed, it is contemplated that a computer program executing the second mode would operate with a pre-existing database, e.g., a database that can be downloaded using the Internet.

The second, database use mode is particularly useful when the mobile device 10, 18 does not receive a satellite signal from which it can derive its location, e.g., due to weather or lack of coverage. Moreover, the mobile device 10, 18 may be one that is not even provided with the ability to process satellite positioning signals. Yet, the mobile device 10 would still be able to determine its location based on the positioning information/pixel pattern database. In one particular embodiment of use, the mobile device 10 does not process satellite positioning signals to determine its location or any other positioning system that requires external sensors, but rather, the mobile device 10 is able to determine its location relying solely on images (pixel pattern recognition) or video from an imaging device on or in the mobile device 10 (vector movement discussed below).

The computer program operates in both modes simultaneously, i.e., both modes are running together in parallel. While the database is being generated (the first database generation mode), the computer program can provide the location of the mobile device 10 (the database use mode). The location could be provided based on either image recognition or differential pixel navigation, discussed below wherein a known location and vector movement from the known location derived through video processing can be used to estimate the current location of the mobile device.

An important aspect of use of the invention relates to drones. As shown in FIG. 3, a drone 18 with an imaging device, such as a camera, and access to a database of pixel patterns and their positional information could be deployed and figure out where it is based solely on images obtained using the imaging device. One or more images would be obtained "in the field" and the drone's processor would analyze the images, determine whether a pixel pattern in any image may be considered a match to one stored in the database, and for those images with such pixel patterns, retrieve the positional information by directing the processor to access the database. The retrieved positional information is analyzed by the processor, upon direction of the computer program, in combination with the angle between the imaging direction and the position of the pixel pattern relative to the center line of the image, and/or the size of the pixel pattern, to determine the location of the drone. By analyzing positional information from multiple pixel patterns via the processor upon execution of the computer program, the location determination of the drone is improved.

In the foregoing, techniques to use images to determine position of a mobile device 10 including an imager are discussed. Generally, these techniques seek to locate a pattern of pixels that has been previously identified and contained in a database 22 of image data obtained by the imaging device of the mobile device or more likely by the imaging device of another imaging device. By extracting information about the position of an imaging device when an image containing the pattern of pixels was taken and/or the appearance of a fixed pattern of pixels in an image taken by the imaging device of the mobile device when at a known position, it is possible to provide a position of the mobile device 10.

Another issue arises when the mobile device 10 moves and it is desired to quantify this movement. The movement quantification may apply after the initial position of the mobile device 10 has been determined by referring to the database 22, or the position of the drone 18 has been determined in a similar manner. Referring to FIG. 6, in step 50, after the position of the mobile device 10 has been provided, the relative movement of the mobile device 10 from its initial position is determined and used to guide or navigate the mobile device 10, or the person holding the mobile device 10 is applicable, to a destination.

More specifically, in one technique, the mobile device 10 obtains images including the same identified pattern of pixels (i.e., a fixed object) and through processing based on differences between the appearance of that pattern in a previously obtained image and in the currently obtained image, can determine the relative movement of the mobile device 10. For example, a monument may appear a fraction of the size in an image taken as the person and the mobile device 10 are walking away from the monument and this size difference can be converted through mathematical processing into an approximation of the movement of the person from the initial determined position. This technique can be used either to determine the relative movement from a known position, and thus the new position, or to confirm or validate a new position derived from a different relative movement determination technique. A map being displayed on a screen of the mobile device 10 may also be updated based on the relative movement of the person and their mobile device 10 from the initial position.

In another embodiment, the mobile device 10 can analyze its relative movement to the initial, known position that has been determined based on image analysis, based on optical techniques that do not require image analysis, this analysis being by a processor upon direction or command of a computer program in the mobile device 10 that resides on non-transitory computer readable medium. As an example of such a technique that does not require image analysis, relative movement of the mobile device 10 can be analyzed using a technique similar to that used by an optical or laser mouse to determine the direction and magnitude of movement. Basically, an optical mouse works based on a change in patterns over a sequence of images. A digital signal processor determines how far the mouse has moved and sends the corresponding coordinates to the computer based on such changes. The same change in pattern analysis can be used by the mobile device 10 to provide an estimation of its relative movement from the initial known position.

Using similar techniques, it possible to guide a pedestrian to a destination by configuring their mobile device 10 to obtain an image in order to determine a known position and then guide them in a path from the known position to the destination based on analysis or determination of relative movement without requiring another image to be obtained and performing position determination based on this another image. Configuration of the mobile device 10 may entail downloading of a computer program that can perform image analysis to determine the initial position and then the subsequent relative movement analysis and then the display of the movement on a screen of the mobile device 10. The computer program may also be configured to provide verbal or audio comments to the person to aid in their guidance to the destination. In this case, the computer program would monitor the distance and direction in which the mobile device 10 is moving and issue corrections or commands to provide for the correct path to the destination.

This guiding technique might be extremely useful for a museum wherein it is possible to guide a person from an entrance to the museum to a series of objects in the museum simply by initially fixing the person's position at the entrance to the museum by accessing the database 22, and then analyzing relative movement from that position. The person is thus guided in a path to the objects using relative movement analysis techniques of their mobile device 10 by means of a processor of the mobile device and a computer program interacting with the processor. The computer program would also interact with the imaging device or other means to enable it to assess the relative movement from the known, initial position. The person could potentially enter the objects they want to see, obtain the position of those objects, and the computer program on the mobile device 10 would configure the necessary relative movement path from the starting point to the objects.

Another use is for a drone 18, e.g., drone navigation inside of a building. The drone 18 would be provided with an imaging device 20 to obtain an image to fix its initial position (see FIG. 3). Then, the drone 18 could be configured to analyze its relative movement from this initial position to conform to a desired path. The drone 18 can thus be guided to a destination from only a single initial position determination using images. Often, a drone 18 has a system like an optical mouse, i.e., a digital signal processor that can analyze changes in patterns over a sequence of images.

In both situations, it is possible to obtain an image during the course of the movement to confirm or validate the relative movement from the initial, known position, and again perform position determination using a pattern of pixels in the obtained image. This new position could then be used as the starting point for another path of movement obtained using relative movement analysis techniques.

The foregoing techniques may be summarized as a navigation technique wherein the first stage is a feature matching stage wherein the absolute position of the mobile device 10 is determined using image analysis, i.e., reference to the database and an attempt to find the closest match for a pattern of pixels contained in an image (consider it the position at time t). The second stage may be considered visual odometry wherein relative movement is analyzed, controlled or directed by a computer program typically resident at the mobile device 10 or drone 18 to direct the movement or correct the movement. This direction or correction may be achieved, when the mobile device is a smartphone or the like with a display and speaker, by the computer program providing oral and/or visual directions to the person holding the mobile device 10, and/or displaying a map of the person's movement relative to the desired movement from the initial known position. The position of the moving mobile device is considered the position at time t+1 second, t+2 seconds, etc.

Visual odometry does not rely on a pre-determined collection of patterns. Instead, it is based on motion of pixels to estimate how the camera (or the device to which the camera is attached or housed within) is moving. There is often a drift that accumulates overtime with the visual odometry. Hence, the resetting of the position using the image feature extraction technique is preferably repeated periodically. It may be repeated whenever an accurate position can be obtained or at set intervals, e.g., every minute Disclosed above is therefore a method for generating a database of pixel patterns with positional information using a mobile device with at least one imaging device in accordance with the invention includes obtaining at least one image using the mobile device including a common pattern of pixels and processing the at least one obtained image based on a size of the pattern of pixels in the image to derive positional information about the pattern of pixels. Each obtained image may also be processed based on angular orientation of the pattern of pixels relative to an imaging direction in which the image was obtained by the mobile device to derive positional information about the pattern of pixels.

When multiple images are obtained, each includes a common, stationary pattern of pixels and they are taken from different positions of the mobile device relative to the pattern of pixels. For example, the mobile device is positioned in each of the positions relative to the pattern of pixels at different times, and an image obtaining actuator on the mobile device is pressed while the mobile device is in each of the different positions. A panoramic camera may be attached to the mobile device and images obtained using the panoramic camera.

Also disclosed above is a method for determining location of a mobile device with at least one imaging device in accordance with the invention includes obtaining at least one image including a stationary pattern of pixels using the mobile device, searching through a database of pixel patterns for the obtained pattern of pixels, retrieving positional information about one of the pattern of pixels that is deemed to be a closest match to the obtained pattern of pixels and analyzing in combination with the retrieved positional information, at least one of an angle between an imaging direction in which the image including the closest match pattern of pixels was obtained by the mobile device and an imaging direction in which the at least one image was obtained, and a size differential between the closest match pattern of pixels and the pattern of pixels in the obtained at least one image to derive positional information about a location of the mobile device. That is, only the size may be analyzed to provide positional information, only the angle may be analyzed to provide positional information or both may be analyzed to provide positional information. The database may be generated as described above or may be generated in a different way to store pixel patterns and associated positional information about the location at which the image was taken.

The derived positional information may be provided to the mobile device in different ways, e.g., visually and/or audibly. For example, the method may entail displaying on a screen of the mobile device, indications of the location of the mobile device and surrounding structure and optionally the position of the pixel pattern used in the location determination.

A navigation method in accordance with the invention disclosed above includes determining an initial position of a mobile device to be guided as according to any of the techniques mentioned above, and then guiding movement of the mobile device, after the initial position of the mobile device is determined, by analyzing using the processor, movement of the mobile device relative to the initial position. This method may be implemented in a system or computer program. Guiding of the movement of the mobile device may entail obtaining multiple images each including a common pattern of pixels and obtained at different times separated by movement of the mobile device and analyzing, using the processor, the images to determine relative movement of the mobile device. This image analysis to determine relative movement may be performed using known algorithms.

Another technique to guide movement of the mobile device entails obtaining multiple images at different times separated by movement of the mobile device and analyzing, using the processor, changes in patterns in the images to determine relative movement of the mobile device.

In one embodiment, the method also involves determining an accurate updated position of the mobile device to be guided as according to any of the techniques described above, after the movement of the mobile device has been guided by analyzing movement of the mobile device relative to the initial position, and then using this updated position, guiding movement of the mobile device, after the updated position of the mobile device is determined, by analyzing using the processor, movement of the mobile device relative to the updated position. Any processor used may be a common processor that performs all of the steps or different, co-located or physically separated processors.

To the extent necessary to qualify the invention as patent-eligible subject matter, the methods in accordance with the invention disclosed above may be considered an improvement to mobile device positioning methods, i.e., "improvements to another technology or technical field". While numerous methods and arrangements are known to determine the position of mobile devices and enable them to be tracked over time, the present invention improves known prior art mobile device positioning methods by improving the determination of the position using stationary objects and a database of positional information about the objects. This database relies on assessment of the appearance of pixel patterns in images relative to known positions of a mobile device that initially imaged the pixel pattern to operatively and later determine position of the same or another mobile device relative to the pixel pattern, and thus the absolute position of the mobile device.

Figure 8:
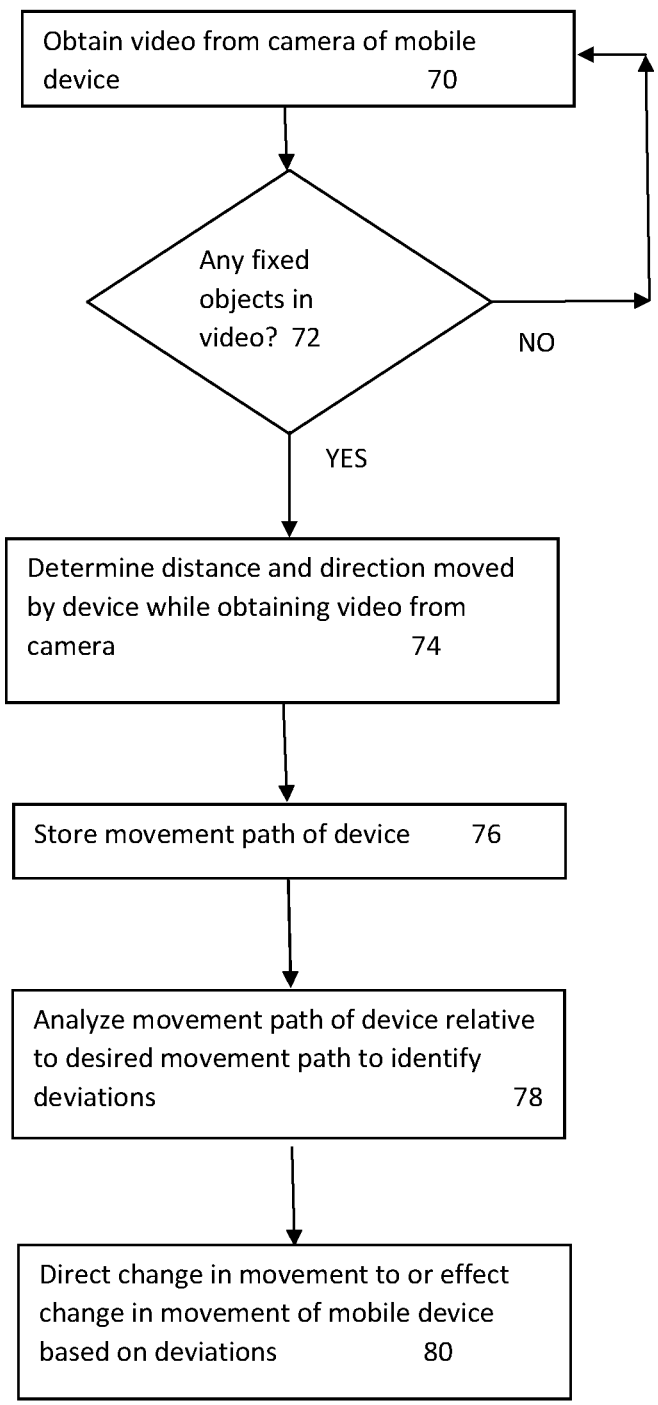
FIG. 8 is a flow chart of a method for determining a path of movement of a mobile device and optionally take an action in response to the determined path of movement.
Figure 9:
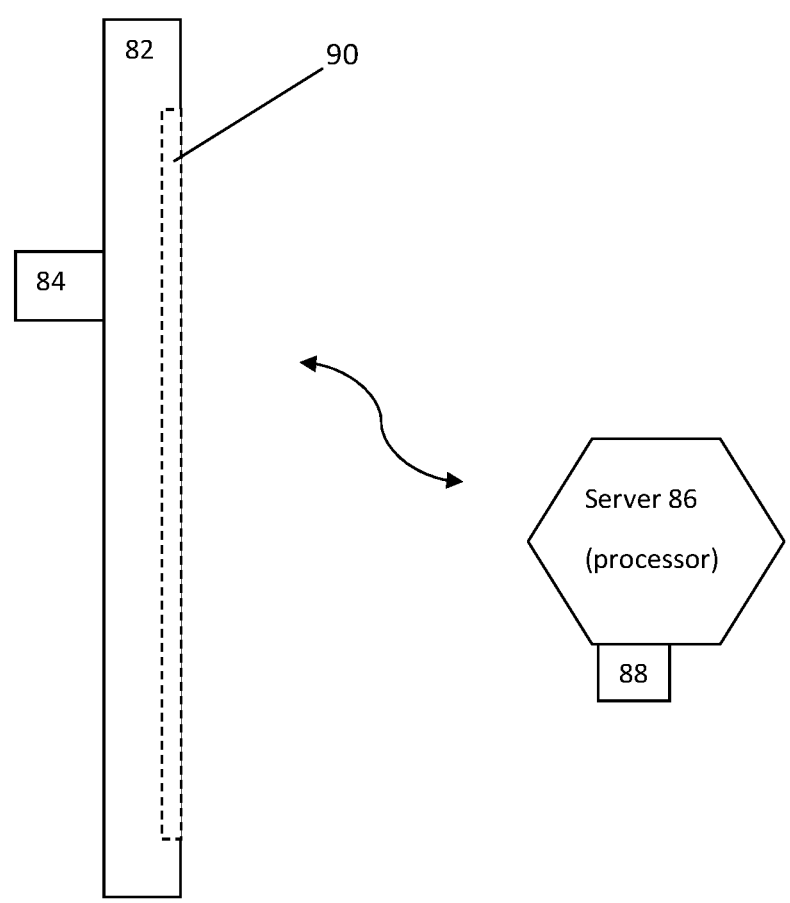
FIG. 9 is a schematic of a system including a mobile device and server that is used to perform the method depicted in FIG. 8.

Referring now to FIGS. 8 and 9, a method in accordance with the invention enables a path of movement of a mobile device to be determined using only an imaging device on the mobile device, e.g., a camera integrated into the mobile device or attached to a mobile device, and used to take one or more actions. In the former situation, the camera may be part of a cell phone, tablet computer, laptop computer, desktop computer, and the like. In the latter situation, the camera may be attached to a robot, drone, automated vacuum cleaner, or other automated piece of machinery that moves. Output obtained by the method, as well as a system or device that performs the method and a computer program that executes the method, may be a line that represents the movement of the mobile device, which may be overlaid onto a grid or other coordinate system as a reference.

Position of the mobile device is provided in real-time. This means that as the mobile device is moving, the actual movement is almost instantaneously converted into an indication of the path of movement, i.e., the vector of the movement of the device after each processing interval may be immediately derived. The vectors are then connected to one another to derive the line or path of movement. This path of movement can be indicated on a display, whether on the mobile device itself, on a display of a system that is monitoring the movement of the mobile device, or both.

The coordinate system may be two-dimensional, for example, when the device can only move in two dimensions like a vacuum cleaner along a floor, or three-dimensional, for example, when the device is movable vertically as well like a cell phone or drone. The coordinate grid lines are derived from imaging as well, comprising pixels obtained through triangulation. Triangulation between images is a process known since stereoscopy exists (the process of using two images from two different cameras to triangulate pixels in three dimensions). One skilled in the art would therefore readily be able to generate the coordinate grid lines for use in the invention based on images obtained by the imaging device on the mobile device.

On the display, the grid lines may be represented by lines of one color while the path of movement is represented by a different color line, and the current position of the mobile device by a dot of yet another color. The path of movement is displayed relative to the grid lines. The grid lines are optional, and it may be desired to display only the path of movement, or possibly the path of movement within the confines of an area in which the mobile device is moving. The boundary lines of this area could thus be displayed for this embodiment, showing the path of movement of the mobile device within this area.

An important aspect of the invention is that it is not required to display or provide the absolute position of the mobile device. Rather, the relative position of the mobile device to the grid lines or the boundary lines of the area may be displayed. The invention is thus particularly useful for situations where only the movement of the mobile device is sought without reference to a fixed geographic location. That is, it may be desirable to know that the mobile device is moving in a circle but not necessarily that the circle is centered about a fixed landmark. Also, it does not matter whether the mobile device is indoors or outdoors, but the invention is useful and operable anywhere the imaging device is functional.

The first step in the method for controlling movement of a mobile device is to obtain a video from the imaging device on the mobile device during movement of the mobile device, step 70. The main requirement for this video is that there must be a fixed object present in the video, which will be used as a reference to track the movement of the mobile device. To obtain this analyzeable video, a video is obtained and analyzed in step 72, using a processor, to determine whether a fixed-in-position object is present in multiple sequentially obtained frames of the video. The same object must be present in multiple frames to enable the vector of movement to be determined, since movement relative to that same object is needed. If a video is determined in step 72 not to contain such an object, another video is obtained in step 70. The loop of steps 70 and 72 may considered a loop to ensure that a video used for further processing has one or more fixed objects.

Once a video with at least one fixed object is obtained from the loop of steps 70 and 72, the video is analyzed on a frame by frame basis to determine distance and direction moved by the mobile device while obtaining that video, in step 74. This analysis may be performed by a processor at a remote location, e.g., at a server, which receives the video from the mobile device using a communications system on the mobile device and a cooperating communications system at the server. Such communications systems are known to those skilled in the art to which this invention pertains, as well as protocols that can be used to transfer the video from the mobile device to the server. By transferring the video to the server to be analyzed on or at the server, where greater processing capabilities are present than on the mobile device, the video processing can be performed at a higher speed and with greater accuracy. Nevertheless, it is also possible to perform the analysis using a processor on the mobile device itself, or using both a processor on the mobile device and a processor on or at the server. The former situation might be appropriate for a drone that operates in regions without communications capabilities.

Determination of whether to transmit the video to the server for analysis or perform the video analysis using the processor of the mobile device may be determined by the processor the mobile device based on such factors as the availability of a server that can process the video, the availability of communications with the server to enable the transmission of the video, etc.

Regardless of where the video is processed, the video is processed during the movement of the mobile device while continually obtaining additional frames that constitute the video, which is a series of frame with each newly acquired frame being added to the previously obtained frames to thereby add to the video. This frame by frame analysis means that each frame is compared to the frame before it to determine the position of the mobile device when each frame was obtained relative to the same object. It is not necessary to analyze each frame, but rather, it may be possible to analyze frames at certain intervals, e.g., every five or ten frames of the video, since the video may have a large amount of frames per second. Thus, a frame by frame analysis does not mean that each frame is analyzed but rather that frames a set interval from one another are analyzed.

From this analysis, the differential position of the mobile device may be obtained. It is thus possible to determine that the mobile device moved a specific distance in a specific direction, i.e., the vector of movement is determined during the time between analyzed frames. Importantly, it does not matter whether the absolute position of the fixed object is known, it is unnecessary. All that is required is that the same object is present in both frames being analyzed.

The movement of the mobile device is stored in a memory component, step 76, accessible to the processor.

As an example of what action may be taken with the determined path of movement of the mobile device, in one embodiment, an additional analysis performed by the processor that may be performing the frame by frame analysis, whether at the server or in the mobile device, is of the determined distance and direction relative to predetermined distance and direction intended for movement of the mobile device to determine any differences, step 78. In this embodiment, there may be a desired path for movement of the mobile device which is available to the processor, e.g., from a database or memory component after user entry, and the processor performs a comparison to determine deviations from the desired path. This analysis is also being performed while the mobile device is obtaining the video.

Determination of the path of movement of a mobile device is useful in numerous, different contexts. In one exemplifying context, by knowing the path of movement of a mobile device, it is possible to effect a change in the movement of the mobile device whenever any differences are determined to be present between the distance and direction moved by the mobile device while obtaining the analyzeable video and the predetermined distance and direction intended for movement of the mobile device, step 80.

As examples, when the mobile device is a movable robot, effecting the change in movement may entail generating and providing commands or directions to an actuator of the robot to change its direction of movement. The end result is control of the movement of the robot to provide for a desired path of its movement. When the mobile device is an airborne drone, effecting the change in movement may entail generating and providing commands or directions to an actuator of the drone to change its direction of movement. The end result is control of the movement of the drone to provide for a desired path of its movement. When the mobile device is a cellular telephone, effecting the change in movement of the cell phone may entail emitting from a sound generator on the mobile device, directions to enable a holder of the mobile device to change their direction of movement and/or displaying on a display of the mobile device, a map including directions to enable a holder of the mobile device to change their direction of movement.

A diagram of movement of the mobile device is thus generated and includes any changes in movement that have been effected. This diagram of movement of the mobile device may be displayed on a display of the mobile device, at the server, at a control station which is monitoring the mobile device, and/or at other locations and on other devices.

To maintain and improve accuracy of the position, a fixed object may be identified and its identification data stored in memory accessible by the processor, e.g., pixels associated with this object. This fixed object may be the same as or different than the object being used to determine whether a video is analyzeable. Once the fixed object is identified and the video analysis has begun, the computer program being executed by the processor to perform the analysis can also analyze the video frames to determine whether this fixed object is present. When the processor determines that the fixed object is present in a video frame, it can re-position the mobile device at the location of origin.

For example, if there is an object of furniture at the beginning of the analyzeable video and its pixel representation is stored in the memory component, the mobile device may move in a room relative to this object without the object being present in the video frames. The path of the mobile device is obtained from the differential movement between analyzed frames, i.e., by calculating motion vectors from one analyzed frame to another. Then, when the object of furniture reappears in a video frame, and is recognized as the same object of furniture by the processor, the system positions the mobile device at the origin, assuming the appearance of the object of furniture is the same in the later frame as in the earlier frame. If the appearance is different, yet the same object of furniture, the processor can also re-position the mobile device by analyzing the different appearances (as discussed above). The processor will thereby "close the loop" by resetting the position of the mobile device to the location of origin, which would account for any errors in the motion vector analysis or drift.

The foregoing incorporates a repositioning or relocation feature into the computer program that executes the method, as well as into the method and the system that performs the method. The relocation feature is based on configuration of the computer program, and its operating algorithm, to not only compute the trajectory of movement of the mobile device from consecutive frames of the analyzeable video, but also to learn the position of the pixels being imaged and determined to be fixed objects. This allows the mobile device to be able to return to a prior known position, even when restarting the algorithm, and also detect when the device is getting back to a previously known place, and correct the potential drift accumulated over time. This is possible when the mobile device sees the same object having the same appearance and then it knows it is at the same position from which that same object was previously imaged.

FIG. 9 is a schematic of a system that performs the method described above with respect to FIG. 8. There is a mobile device 82 having a camera 84 (shown in an exaggerated state). The mobile device 82 also includes a communications system as known to those skilled in the art to which this invention pertains. The camera 84 obtains a video that is transmitted by the communications system of the mobile device 82 to a server 86 where the video is analyzed. The path of movement of the mobile device 82 is determined and may be used at the server 86, at another remote location that receives the path of movement from the server 86, or be provided to the mobile device 82. The movement path itself does not have to be provided, but rather, derivatives thereof may be generated and provided, e.g., an indication of deviation from expected movement, an alarm if the movement is erratic, a warning if the path does not satisfy a condition, one of a plurality of different messages about movement dependent on the movement path, etc. These may be audible, visual or combinations of both.

A computer program that performs the method disclosed above with respect to FIGS. 8 and 9 would be resident at the mobile device 82 and direct the camera 84 to obtain images forming them into a video (step 70 in FIG. 8). The program would direct the processor at the mobile device 82 to determine if the video contains a fixed object usable for the positioning scheme. If so, the computer program would direct the communications system of the mobile device 82 to transmit the video to the server 86, when the video frame processing is performed at the server 86 as in a preferred embodiment. The computer program could also direct the server 86, via commands being sent with the video, to perform the frame by frame analysis and return the vector of movement of the mobile device 82 between analyzed frames of the video. The computer program could also direct the server 86 to return information about deviations from an expected path of movement of the mobile device 82, the actual path of movement for display on a display 90 of the mobile device 82, directions to be visibly and/or audibly conveyed to effect a change in the movement of the mobile device 82, and signals or commands for other actions to be performed by the mobile device 82. This mobile device computer program may be in the form of an app that is downloaded onto the mobile device 82 and is configured to command activity by a server 86, use of communications systems on the mobile device 82 and associated with the server 86, and other devices such as a display to provide a result of the analyzed path of movement of the mobile device 82.

A computer program that performs the method disclosed above with respect to FIGS. 8 and 9 could also be resident at the server 86 and direct commands to the mobile device 82 to cause the camera 84 to obtain images forming them into a video (step 70 in FIG. 8), and send the video to the server 86 via the communications system of the mobile device 82. After the video is received by the server 86, the program would direct the processor at the server 86 to determine if the video contains a fixed object usable for the positioning scheme and if so, perform the video frame processing and derive the vector of movement of the mobile device 82 between analyzed frames of the video. The computer program could also direct the server 86 to generate and provide information via wireless signals to another device about deviations from an expected path of movement of the mobile device 82, the actual path of movement for display on the display 90 of the mobile device 82 or another device, directions to be visibly and/or audibly conveyed to effect a change in the movement of the mobile device 82, and signals or commands for other actions to be performed by the mobile device 82 or another device. This server computer program may be associated with an app that is downloaded onto the mobile device 82 and is configured to link with the server 86 to enable the server 86 to perform the described functions, i.e., be commanded to provide a video to the server 86, etc.

Server 86 is also linked with a memory component or database 88 which stores information about a fixed object used in the repositioning or relocation feature.

The terms "memory media" and "memory component" are intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in to different, spatially separated computers, one of which executes the programs while connected to the other computer over a network to receive program instructions therefrom for execution.

Non-transitory computer readable media includes, but unless inconsistent with the term is not limited to, any data storage device that can store data which can be thereafter read by a computer system. Examples of the non-transitory computer readable medium include ROM, RAM, CD-ROMs, magnetic tapes, floppy disks, and optical data storage devices. The non-transitory computer readable medium can also be distributed over network coupled computer systems so that the computer readable code is stored in one or more physical locations and executed in a distributed fashion. Also, functional programs, code, and code segments for accomplishing the present disclosure can be easily construed by programmers skilled in the art to which the invention pertains in view of the disclosure herein.

The memory media or component may store a software program or programs operable to implement a method for analyzing images to derive positional information for use in generating a database of such positional information or using such positional information to output position of the mobile device. The memory media may also store a software program or programs operable to implement any of the methods disclosed herein, e.g., a navigation method.

Each computer software program may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. Any of the processor disclosed herein may thus include a central processing unit (CPU) for executing code and data from the memory medium and may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM.

Techniques disclosed in U.S. patent application Ser. No. 11/170,337 filed Jun. 29, 2005, now U.S. Pat. No. 7,397,424, Ser. No. 11/549,703 filed Oct. 16, 2006, now U.S. Pat. No. 7,696,923, Ser. No. 12/167,649 filed Jul. 3, 2008, now U.S. Pat. No. 8,565,788, and Ser. No. 12/172,415 filed Jul. 14, 2008, may be used in combination with the inventions disclosed above. All of these applications are incorporated by reference herein.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for controlling movement of a mobile device, comprising:
   obtaining an analyzeable video from an imaging device on the mobile device during movement of the mobile device by
      obtaining at least one video from the imaging device on the mobile device during movement of the mobile device, and
      analyzing, using a processor, each of the at least one obtained video to determine presence of a fixed-in-position object in multiple sequentially obtained frames of the video until a video is obtained including at least one fixed-in-position object in multiple sequentially obtained frames which constitutes the analyzeable video;
   analyzing, using the processor and during the movement of the mobile device while obtaining the analyzeable video, the analyzeable video on a frame by frame basis to determine distance and direction moved by the mobile device while obtaining the analyzeable video and in the interval between frames;
   analyzing, using the processor and during the movement of the mobile device while obtaining the analyzeable video, the determined distance and direction moved by the mobile device while obtaining the analyzeable video relative to predetermined distance and direction intended for movement of the mobile device to determine any differences; and
   effecting a change in movement of the mobile device whenever any differences are determined to be present between the distance and direction moved by the mobile device while obtaining the analyzeable video and the predetermined distance and direction intended for movement of the mobile device.

2. The method of claim 1, further comprising:
   transmitting the at least one video to a server that includes or is associated with the processor; and
   performing the analyzing steps at the server.

3. The method of claim 1, wherein the processor is situated on or in the mobile device such that the analyzing steps are performed at the mobile device.

4. The method of claim 1, further comprising generating a diagram of movement of the mobile device including any changes in movement that have been effected.

5. The method of claim 4, further comprising displaying the diagram of movement of the mobile device on a display.

6. The method of claim 5, wherein the diagram of movement of the mobile device is displayed in two dimensions on the display.

7. The method of claim 5, wherein the diagram of movement of the mobile device is displayed in three dimensions on the display.

8. The method of claim 1, wherein the mobile device is a movable robot, and the step of effecting a change in movement of the mobile device comprises providing commands to an actuator of the robot to change its direction of movement.

9. The method of claim 1, wherein the mobile device is an airborne drone, and the step of effecting a change in movement of the mobile device comprises providing commands to an actuator of the drone to change its direction of movement.

10. The method of claim 1, wherein the mobile device is a cellular telephone, and the step of effecting a change in movement of the mobile device comprises emitting from a sound generator on the mobile device, directions to enable a holder of the mobile device to change their direction of movement.

11. The method of claim 1, wherein the mobile device is a cellular telephone, and the step of effecting a change in movement of the mobile device comprises displaying on a display of the mobile device, directions or a map including directions to enable a holder of the mobile device to change their direction of movement.

12. The method of claim 1, further comprising wirelessly transmitting the analyzeable video to a server separate and apart from the mobile device and which includes or is associated with the processor such that the analyzing steps are performed at least partly by the processor at the server.

13. The method of claim 1, further comprising:
   analyzing, using the processor, frames of the analyzeable video to determine whether a previously imaged, fixed object is present in any of the frames; and
   when that object is determined to be present,
      analyzing, using the processor, whether a position of the mobile device relative to that object is accurate based on data about that object and the mobile device stored in a memory component accessible to the processor, and if not,
      adjusting, using the processor, the position of the mobile device based on the determined position of the mobile device relative to that object.

14. The method of claim 13, further comprising:
   generating a diagram of movement of the mobile device including any changes in movement that have been effected;
   displaying the diagram of movement of the mobile device on a display; and
   displaying the adjusted position of the mobile device on the display.

15. The method of claim 1, further comprising:
   initially determining, using the processor, the presence of an object in a frame of the analyzeable video;
   storing, in a memory component, identification data about the object whose presence is initially determined;
   determining, using the processor, the position of the mobile device relative to that object; then
   analyzing, using the processor, subsequent frames of the analyzeable video to determine whether that object is present in any of the subsequent frames; and
   when that object is determined to be present in a subsequent frame of the analyzeable video, determining, using the processor, whether a current position of the mobile device is accurate relative to that object and if not, adjusting, using the processor, the position of the mobile device based on the determined position of the mobile device relative to that object.

16. A method for controlling movement of a mobile device, comprising:
obtaining an analyzeable video from an imaging device on the mobile device during movement of the mobile device by
obtaining at least one video from the imaging device on the mobile device during movement of the mobile device,
analyzing, using a processor, each of the at least one obtained video to determine presence of a fixed-in-position object in multiple sequentially obtained frames of the video until a video is obtained including at least one fixed-in-position object in multiple sequentially obtained frames which constitutes the analyzeable video, and
storing data about a fixed object at a beginning of the analyzeable video;
analyzing, using the processor during the movement of the mobile device while obtaining the analyzeable video, the analyzeable video on a frame by frame basis to determine distance and direction moved by the mobile device while obtaining the analyzeable video and in the interval between frames;
generating a diagram of movement of the mobile device;
displaying the diagram of movement of the mobile device on a display;
analyzing, using the processor, frames of the analyzeable video to determine whether a previously imaged, fixed object is present in any of the frames; and
when that fixed object is determined to be present,
analyzing, using the processor, whether a position of the mobile device relative to that fixed object is accurate based on position information about that fixed object and the mobile device stored in a memory component accessible to the processor, and if not,
adjusting, using the processor, the position of the mobile device based on the determined position of the mobile device relative to that fixed object and displaying the adjusted position of the mobile device on the display.

17. The method of claim 16, further comprising wirelessly transmitting the analyzeable video to a server separate and apart from the mobile device, the analyzing steps being performed at least partly by a processor at the server.

18. The method of claim 16, further comprising:
analyzing, using the processor and during the movement of the mobile device while obtaining the analyzeable video, the determined distance and direction moved by the mobile device while obtaining the analyzeable video relative to predetermined distance and direction intended for movement of the mobile device to determine any differences; and
effecting a change in movement of the mobile device whenever any differences are determined to be present between the distance and direction moved by the mobile device while obtaining the analyzeable video and the predetermined distance and direction intended for movement of the mobile device.

19. A computer program embodied on non-transitory computer storage medium, and which is configured to:
receive at least one video from an imaging device on a mobile device during movement of the mobile device;
analyze each of the at least one video to determine presence of a fixed-in-position object in multiple sequentially obtained frames of the video until a video is received including at least one fixed-in-position object in multiple sequentially obtained frames which constitutes an analyzeable video;
analyze the analyzeable video on a frame by frame basis to determine distance and direction moved by the mobile device while obtaining the analyzeable video and in the interval between frames;
analyze the determined distance and direction moved by the mobile device while obtaining the analyzeable video relative to predetermined distance and direction intended for movement of the mobile device to determine any differences; and
effect a change in movement of the mobile device whenever any differences are determined to be present between the distance and direction moved by the mobile device while obtaining the analyzeable video and the predetermined distance and direction intended for movement of the mobile device.

20. The computer program of claim 19, wherein the computer program is further configured to:
analyze frames of the analyzeable video to determine whether a previously imaged, fixed object is present in any of the frames;
when that fixed object is determined to be present,
analyze whether a position of the mobile device relative to that fixed object is accurate based on data about that fixed object and the mobile device stored in a memory component accessible to the processor, and if not,
adjust the position of the mobile device based on the determined position of the mobile device relative to that fixed object;
generate a diagram of movement of the mobile device including any changes in movement that have been effected;
cause display of the diagram of movement of the mobile device on a display; and
cause display the adjusted position of the mobile device on the display.

* * * * *